US011535367B2

(12) United States Patent
Frank et al.

(10) Patent No.: US 11,535,367 B2
(45) Date of Patent: Dec. 27, 2022

(54) EMERGENCY BRAKING METHOD FOR AN AIRCRAFT

(71) Applicant: SAFRAN LANDING SYSTEMS, Velizy Villacoublay (FR)

(72) Inventors: David Frank, Moissy-Cramayel (FR); Jérôme Fraval, Moissy-Cramayel (FR); Donny Warint, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 507 days.

(21) Appl. No.: 16/438,712

(22) Filed: Jun. 12, 2019

(65) Prior Publication Data

US 2019/0382103 A1 Dec. 19, 2019

(30) Foreign Application Priority Data

Jun. 14, 2018 (FR) ..................................... 18 55207

(51) Int. Cl.
*B64C 25/44* (2006.01)
*B60T 7/08* (2006.01)
(Continued)

(52) U.S. Cl.
CPC .............. *B64C 25/44* (2013.01); *B60T 7/085* (2013.01); *B60T 13/686* (2013.01); *F15B 11/16* (2013.01);
(Continued)

(58) Field of Classification Search
CPC ................ F15B 11/16; F15B 2211/427; F15B 2211/4159; F15B 2211/6346;
(Continued)

(56) References Cited

U.S. PATENT DOCUMENTS 4,307,917 A * 12/1981 Hasselbacher ........ B60T 15/041
303/10
6,193,326 B1 * 2/2001 Ybert ........................ B60T 8/00
303/14
(Continued)

FOREIGN PATENT DOCUMENTS

EP  3 333 070 A1  6/2018
GB  2 116 271 A   9/1983
GB     2450796 A * 1/2009 ........... B64C 25/405

OTHER PUBLICATIONS

French Preliminary Search Report for FR 1855207 dated Mar. 4, 2019.

*Primary Examiner* — Robert A. Siconolfi
*Assistant Examiner* — San M Aung
(74) *Attorney, Agent, or Firm* — Sughrue Mion, PLLC

(57) ABSTRACT

An emergency braking method for aircraft, comprising using a progressing parking brake controlled by a lever (10) that can be actuated by the pilot between a "0%" position in which the brakes are connected to the return pressure of the aircraft, and a "100%" position in which the brakes are connected to the feed pressure of the aircraft, the lever being blockable in the 100% position in order to provide parking braking when the aircraft is stationary. According to the invention, the emergency braking method being characterized in that it comprises:

using a valve having an outlet port connected to the brakes, a return port, and a feed port, the valve presenting a state connecting the outlet port to the return port and a state connecting the outlet port to the feed port; and controlling the valve to occupy one or other of those states by pulse width modulation (PWM) having a duty ratio (R) that is a function of the position of the lever in order (Continued)

to deliver the brakes with pressure lying in the range return pressure to feed pressure, depending on the position of the lever.

5 Claims, 1 Drawing Sheet

(51) Int. Cl.
*B60T 13/68* (2006.01)
*F15B 11/16* (2006.01)
(52) U.S. Cl.
CPC . *B60T 2270/402* (2013.01); *F15B 2211/4159* (2013.01); *F15B 2211/427* (2013.01); *F15B 2211/6346* (2013.01)
(58) Field of Classification Search
CPC ....... B64C 25/445; B64C 25/42; B64C 25/44; B60T 8/325; B60T 8/326; B60T 8/1703; B60T 8/00; B60T 8/3255; B60T 13/66; B60T 13/662; B60T 13/686; B60T 13/746; B60T 7/085; B60T 17/18; B60T 2270/88; B60T 2270/402
USPC .................................................. 188/151 R
See application file for complete search history.

(56) References Cited

U.S. PATENT DOCUMENTS

| | | |
|---|---|---|
| 2001/0037927 A1 | 11/2001 | Nagler et al. |
| 2010/0102173 A1* | 4/2010 | Everett ............... G05D 1/0816 244/175 |
| 2011/0226569 A1* | 9/2011 | Devlieg ............... B60T 8/1703 188/158 |
| 2012/0223572 A1* | 9/2012 | Frank .................. B60T 13/686 303/14 |
| 2014/0076641 A1 | 3/2014 | Penev |
| 2014/0156160 A1* | 6/2014 | DeVlieg ................. B60T 8/00 701/70 |

* cited by examiner

EMERGENCY BRAKING METHOD FOR AN AIRCRAFT

The invention relates to an emergency braking method for an aircraft.

BACKGROUND OF THE INVENTION

Aircraft, such as commercial airplanes of large size for transporting passengers, are known that include a main braking circuit and an emergency braking circuit suitable for use in the event of a failure of the main braking circuit. Those circuits are completely segregated and each of them requires a large number of passive hydraulic components such as accumulators, filters, and active hydraulic components such as gates, valves, and servo-valves, adapted to deliver braking pressure in proportion to a braking setpoint determined by a braking computer, in particular as a result of the pilot acting on the brake pedals. In addition to those two circuits, the aircraft is generally fitted with a parking brake device adapted to hold the aircraft stationary, after a parking selector has been operated by the pilot, by applying and maintaining a given pressure (the brake feed pressure, usually delivered by an accumulator) in the brakes while the aircraft is stationary, e.g. by using a bistable valve.

Although that architecture is very safe, it is complex and it is often not possible to envisage using it on smaller aircraft, such as regional airplanes or business airplanes. Aircraft of this size often have only one braking circuit, and a "progressive" parking brake that can also be used for emergency braking. The parking brake is controlled by a lever that is mechanically connected to the slide of a proportional valve so that the pilot can perform emergency braking by moving the lever between a "0%" position in which the brakes are at the aircraft return pressure, and a "100%" position in which the brakes are at the aircraft feed pressure. The lever can be blocked in the 100% position in order to provide a parking brake. Nevertheless, the mechanical connection, which takes place via cables, pulleys, connecting rods, requires a considerable length of time to install, needs numerous supports in the structure of the aircraft, and gives rise to regular maintenance actions (verification, tension adjustment, greasing, . . . ).

OBJECT OF THE INVENTION

The invention seeks to propose an emergency braking method that is simpler than existing methods.

SUMMARY OF THE INVENTION

In order to achieve this object, there is provided an emergency braking method for aircraft, comprising using a progressive parking brake controlled by a lever that can be actuated by the pilot between a "0%" position in which the brakes are connected to the return pressure of the aircraft, and a "100%" position in which the brakes are connected to the feed pressure of the aircraft, the lever being blockable in the 100% position in order to provide parking braking when the aircraft is stationary. According to the invention, the emergency braking method being characterized in that it comprises:

using a valve having an outlet port connected to the brakes, a return port, and a feed port, the valve presenting a rest state in which the outlet port is connected to the return port and an active state in which the outlet port is connected to the feed port; and controlling the valve to occupy one or the other of those states by pulse width modulation (PWM) having a duty ratio that is a function of the position of the lever in order to deliver to the brakes with pressure lying in the range return pressure to feed pressure, depending on the position of the lever.

It is thus possible to use a two-state valve of simple design both to provide progressive emergency braking and to provide parking braking. Pulse width modulation (PWM) control serves to transform the valve into a proportional valve by implementing a form of control that is simple and robust, enabling the brakes to be fed with pressure that varies over the range return pressure when the lever is in its 0% position to feed pressure when the lever is in its 100% position. All mechanical connections between the lever and the valve are eliminated and replaced by electrical type control. Parking braking proper is then provided by bringing the lever into its 100% position and blocking it there.

Advantage is thus taken of the simplicity of the parking braking provided using a simple two-position valve, while nevertheless providing emergency braking using electrical control that is simple, and avoiding any use of a valve having a slide mechanically connected to a lever.

The frequency of the pulse width modulation naturally depends on the passband of the hydraulic circuit of the aircraft, and thus on the length of the hydraulic circuit, on the volume of the cavity in the brake, . . . . Typically, a frequency of a few hertz appears to suffice for providing proportional control, given the natural filtering induced by the hydraulic circuit.

In practice, it suffices to provide the lever with any device suitable for delivering a voltage that is proportional to its position, e.g. a potentiometer, and to apply that voltage to an electronic card carrying a circuit that is specialized in controlling a two-state valve by pulse width modulation so as to deliver open/close orders to the valve.

In order to enhance braking performance and in order to fill the cavities in the brakes before applying modulation, the electronic circuit is adapted to cause the valve to be put into the active state for a predetermined length of time prior to applying modulation.

It should be observed that this PWM operation takes place relatively rarely in the lifetime of the aircraft, since it only occurs during an emergency, in the event of the main braking circuit failing. Even if the pump that delivers that the feed pressure fails, emergency braking can still be performed using only the pressure in the accumulator of the hydraulic circuit. In most ordinary situations, the lever is used for providing parking braking when the aircraft is stationary. In this situation, the pilot pulls on the lever directly until it reaches its 100% position while the aircraft is stationary. The valve is then controlled to occupy the active state and to remain therein.

DESCRIPTION OF THE FIGURES

The invention can be better understood in the light of the following description of a particular implementation of the invention given with reference to the figures of the accompanying drawing, in which.

DETAILED DESCRIPTION OF THE INVENTION

Figure 1:
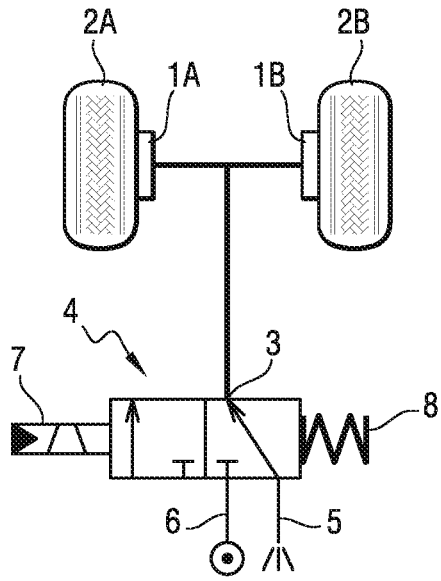
FIG. 1 is a diagram of the hydraulic circuit including a two-state valve that is used for performing emergency braking of the invention.

FIG. 1 shows a hydraulic circuit suitable for implementing emergency braking of the invention. This emergency braking circuit is additional to a main braking circuit, that is not shown. In this example, the aircraft has two brakes 1A and 1B associated with braked wheels 2A and 2B having brakes that are connected to the outlet port 3 of a two-state slide valve 4 having a rest state that is stable (as shown in FIG. 1) in which the slide of the valve 4 connects the outlet port 3 to a return port 5, and an active state in which the slide of the valve 4 connects the outlet port 3 to a feed port 6. A coil 7 forces the slide of the valve 4 to take up the active state when the coil 7 is powered by a control voltage, and a spring 8 returns the slide of the valve 4 to the rest state when the coil 7 is no longer powered.

According to the invention, the coil 7 is powered so that the pressure delivered to the brakes 1A and 1B via the outlet port 3 is a function of the position of a lever 10 operated by the pilot of the aircraft. For this purpose, the position of the lever 10 in this example is measured by means of a potentiometer 11 having its output transmitted to an electronic card 12 having means for processing the signal that are adapted to generate a control signal 13 for a first selector 14 that selectively connects a first terminal of the coil 7 either to ground 15 or else to a direct current (DC) voltage source (in this example of 28 volts (VDC)).

Figure 3:
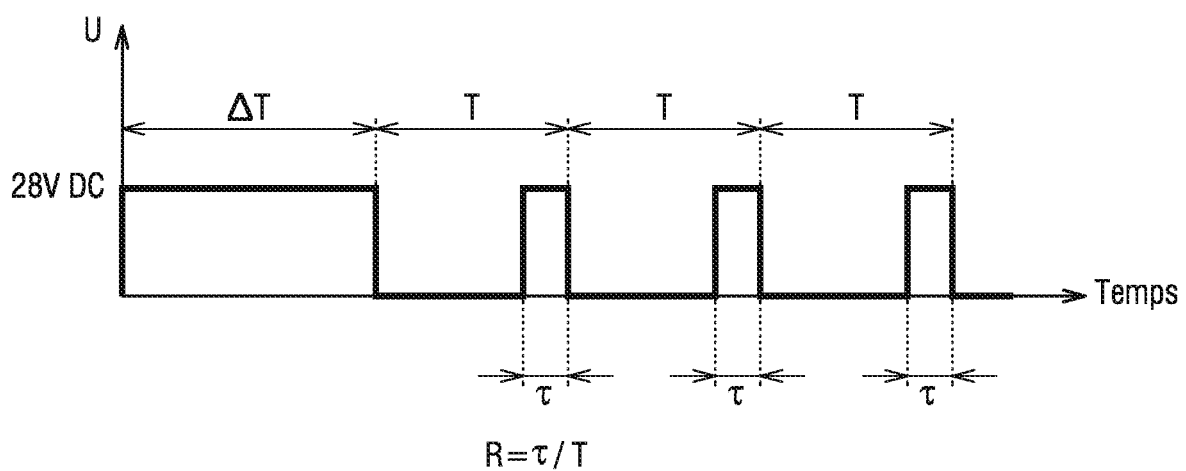
FIG. 3 is a graph showing the voltage sent to the terminals of the coil of the FIG. 1 valve by applying pulse-width modulation.

In this example, the electronic card 12 is adapted to perform a pulse-width modulation (PWM) method as shown in FIG. 3. When the lever 10 is raised by the pilot from an initial "0%" position, the selector 14 applies voltage to the coil 7 for a first determined time ΔT, thereby directing hydraulic fluid to fill the cavities of the brakes 1A and 1B. Thereafter, for each successive period T, the electronic card 12 determines an open time τ which in this example is a function of the position of the lever 10 in the range from its 0% position to its 100% position, corresponding to the maximum stroke of the lever, with this being done in application of a proportional relationship, for example. The valve 4 then connects the outlet port 3 to the feed port 6 for a length of time τ, and connects the outlet port 3 to the return force 5 for the complementary length of time T−τ, thereby determining an open duty ratio R=τ/T. The mean pressure seen by the brake is a function of the open duty ratio R and it increases as this open ratio increases between the return pressure and the feed pressure. Thus, using a simple two-state valve, control is thus obtained that is proportional to the position of the lever 10. The pilot can then perform manual braking, and can vary its magnitude at will by acting on the lever 10, specifically in the event of the main braking circuit failing.

The same valve 4 also serves to perform parking braking. It suffices for the pilot to bring the lever 10 to the 100% position and for it to be held there. For this purpose, the lever 10 may be fitted with a catch for holding the lever 10 in the 100% position. In this position, the open time t is equal to the period T, leading to an open ratio R of 100%, such that the valve 4 is held permanently in the active state.

Figure 2:
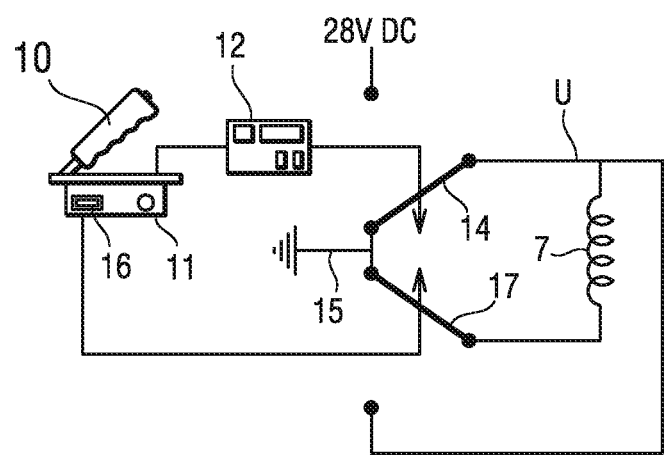
FIG. 2 is an electric circuit diagram showing how the valve used in the FIG. 1 hydraulic circuit is controlled using a progressive parking brake lever.

For safety reasons, and in order to avoid a simple failure of the emergency braking circuit giving rise to unwanted braking, the lever 10 is provided with an inhibit switch 16 that controls a second selector 17 for selectively connecting the second terminal of the coil 7:

either to ground 15 (as shown in FIG. 2) so that powering the first terminal of the coil by the DC source causes the coil to be activated and thus puts the valve in the active state;

or else to the first terminal of the coil 7 so as to short-circuit the coil, such that powering the first terminal of the coil from the DC source leaves the valve in the rest state.

Because of this second selector 17, the emergency braking circuit can operate in the following modes:

inhibited mode (PARK OFF): the pilot actuates the inhibit switch 16 (or in a variant the inhibit switch 16 is actuated directly by the lever when it is returned to the 0% position) so as to control the second selector 17 to short-circuit the coil 7, so that even if the lever 10 is operated inadvertently, no undesired braking can take place. The valve coil is then inhibited;

emergency braking mode: as soon as the pilot moves the lever 10 beyond a critical position (e.g. 5%), the second selector 17 is automatically moved so as to ground the second terminal of the coil, thereby enabling the aircraft to be braked progressively by means of the lever. Where applicable, isolation means prevent any possibility of the main braking circuit sending pressure to the brake so long as emergency braking mode is activated; or parking brake mode: this mode is activated by the pilot bringing the lever to its 100% position and keeping it there. The valve 4 preferably has a bistable electromagnetic stage enabling the valve 4 to be held stationary in the active state once the valve 4 has been held in this state for a predetermined length of time (e.g. a few seconds) without the coil 7 being powered. Thus, parking braking can be maintained while avoiding draining the batteries of the aircraft while it is stationary.

The invention is not limited to the above description, but on the contrary covers any variant coming within the ambit defined by the claims.

In particular, although in this example the valve 4 is activated by means of a coil, any other actuator could be used, e.g. such as an electric motor. Although the lever sensor in this example is a potentiometer, it is possible to use any other type of sensor, e.g. an inductive sensor of the rotary variable differential transformer (RVDT) type.

The invention claimed is:

1. An emergency braking method for aircraft, the emergency braking method comprising:

using a progressive parking brake in the event of a failure of a main brake, the progressive parking brake being controlled by a lever that can be actuated by a pilot between a "0%" position in which the brakes are connected to the return pressure of the aircraft, and a "100%" position in which the brakes are connected to the feed pressure of the aircraft, the lever being blockable in the 100% position in order to provide parking braking when the aircraft is stationary;

using a valve having an outlet port connected to the brakes, a return port, and a feed port, the valve presenting a rest state in which the outlet port is connected to the return port and an active state in which the outlet port is connected to the feed port; and controlling the valve to occupy one or the other of those states by pulse width modulation having a duty ratio that is a function of the position of the lever in order to deliver to the brakes with pressure lying in the range return pressure to feed pressure, depending on the position of the lever.

2. An emergency braking method for aircraft, the emergency braking method comprising using a progressive parking brake controlled by a lever that can be actuated by the pilot between a "0%" position in which the brakes are connected to the return pressure of the aircraft, and a "100%" position in which the brakes are connected to the feed pressure of the aircraft, the lever being blockable in the 100% position in order to provide parking braking when the aircraft is stationary;

using a valve having an outlet port connected to the brakes, a return port, and a feed port, the valve presenting a rest state in which the outlet port is connected to the return port and an active state in which the outlet port is connected to the feed port; and controlling the valve to occupy one or the other of those states by pulse width modulation having a duty ratio that is a function of the position of the lever in order to deliver to the brakes with pressure lying in the range return pressure to feed pressure, depending on the position of the lever, wherein, the valve is returned to the rest state by a return spring and is placed in the active state by a coil powered by a first selector connecting a first terminal of the coil in alternation to ground or to a DC voltage source in response to a control signal for the selector that is determined by pulse width modulation.

3. The method according to claim 2, wherein a second selector is arranged to connect a second terminal of the coil selectively to ground or to the first terminal of the coil in response to a signal coming from a coil inhibit switch.

4. The method according to claim 1, wherein, when the lever is actuated, the valve is put into the active state for a determined length of time before subjecting the valve to control by pulse width modulation.

5. The method according to claim 1, wherein the valve is held stationary in the active state once the valve has been held in this state by holding the lever in the 100% position.

* * * * *